United States Patent [19]

Takami et al.

[11] Patent Number: 4,508,072
[45] Date of Patent: Apr. 2, 1985

[54] SEALING DEVICE FOR TIMING BELT COVER AND ENGINE MOUNT BRACKET

[75] Inventors: Toshihiro Takami; Masahiro Isobe, both of Toyota, Japan

[73] Assignee: Toyota Jidosha Kabushiki Kaisha, Toyota, Japan

[21] Appl. No.: 490,201

[22] Filed: Apr. 29, 1983

[30] Foreign Application Priority Data

Feb. 12, 1983 [JP] Japan .................. 58-018096[U]

[51] Int. Cl.³ ............................. F02B 77/00
[52] U.S. Cl. .................. 123/195 C; 123/195 A; 123/198 E; 181/204; 277/97; 277/206 R; 277/212 R; 180/291; 180/312; 24/563; 74/606 R
[58] Field of Search ........... 123/198 E, 195 C, 195 A; 181/204; 180/312, 291; 277/97, 205, 206 R, 212 R, 212 C; 24/265 C, 562, 563; 74/606 R

[56] References Cited

U.S. PATENT DOCUMENTS 3,782,496  1/1974  Thien et al. ..................... 181/204
4,181,314  1/1980  Cerf et al. ...................... 277/205
4,261,584  4/1981  Browne et al. ................. 277/206 R
4,327,679  5/1982  Crouch et al. ................. 123/195 C Primary Examiner—Craig R. Feinberg
Assistant Examiner—David A. Okonsky
Attorney, Agent, or Firm—Oblon, Fisher, Spivak, McClelland & Maier

[57] ABSTRACT

A sealing device for a timing belt cover and an engine mount bracket comprises a rib formed on said engine mount bracket and a gasket having a lip of C-shaped section and a fixed portion continuous from said lip. The fixed portion of the gasket is attached to a portion of the timing belt cover surrounding an opening provided in said timing belt cover and said lip of C-shaped section of the gasket is contact with said rib of the engine mount bracket. Since the gasket is made of an elastic material other than sponge, e.g. rubber, it does not undergo a permanent deformation and causes no gap between said lip and said rib. Besides, since said lip of C-shaped section is easily deformed, there is no likelihood of an excessive load being applied to said timing belt cover.

16 Claims, 15 Drawing Figures

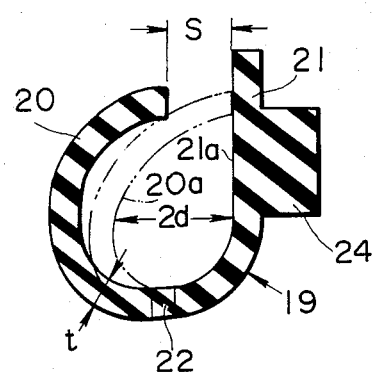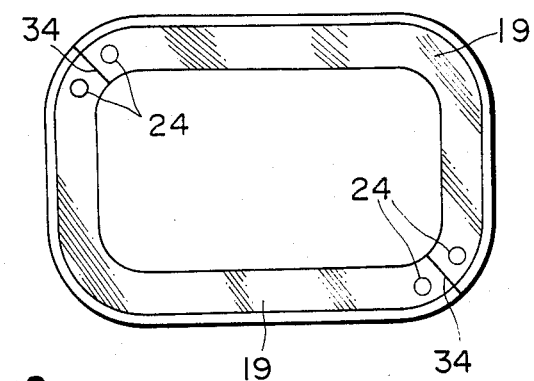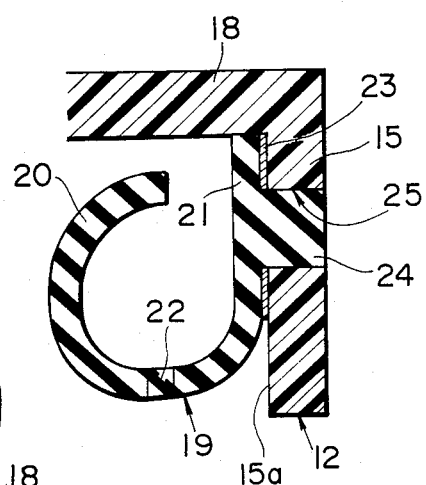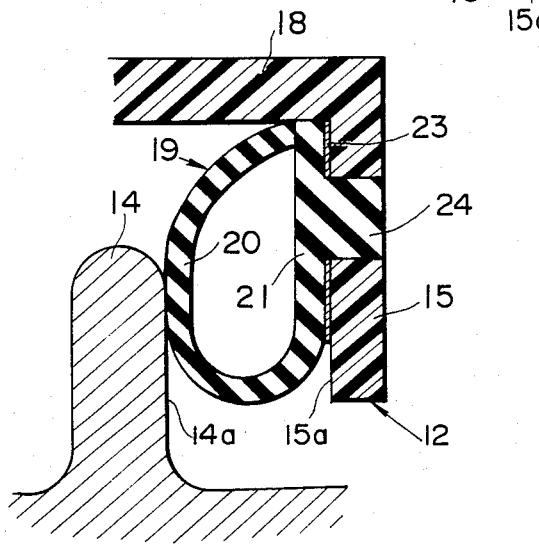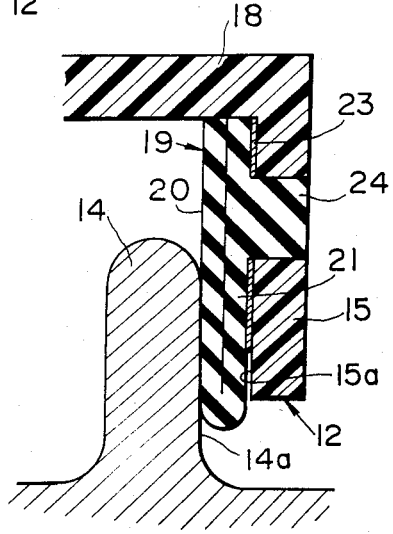

SEALING DEVICE FOR TIMING BELT COVER AND ENGINE MOUNT BRACKET

BACKGROUND OF THE INVENTION

1. Field of the Invention

The present invention relates to a sealing device for a timing belt cover and an engine mount bracket. More particularly, it is concerned with a device for sealing between a timing belt cover attached to an engine of a vehicle and an engine mount bracket extending through the opening of the timing belt cover.

2. Description of the Prior Art

In a front engine front drive vehicle, an engine is normally transversally mounted on the vehicle in the state that its longitudinal axis is directed orthogonally to the longitudinal axis of the vehicle. The transversally mounted engine is supported by the body of the vehicle at the front, rear, right and left ends of the engine. To the right end of the transversally mounted engine is attached a timing belt cover, which prevents water, dust, pebbles or the like from getting into the space between the timing belt cover and the engine where a timing belt is disposed, thereby protecting the timing belt. An engine mount bracket supporting the engine at the right end thereof penetrates the timing belt cover and extends from the engine towards the body of the vehicle through an opening of the timing belt cover. Since the position where the engine mount bracket penetrates the timing belt cover has not, heretofore, been sealed at all, there has been a likelihood of entry of water, dust or the like into the space between the timing belt cover and the engine through said opening of the timing belt cover.

In order to eliminate such a likelihood, the applicant of the present invention previously proposed a sealing device for a timing belt cover and an engine mount bracket of a construction such that a rib is formed on the engine mount bracket near the opening of the timing belt cover and the surface of said rib is opposite to the portion of the timing belt cover surrounding the opening and a plate-like gasket made of sponge is interposed between said rib of the engine mount bracket and said portion of the timing belt cover surrounding the opening to thereby seal the opening (see Japanese Utility Model Application No. 74633/1982 not laid open yet). Such a sealing device as proposed above is also advantageous in that both a dimensional variation in manufacture of the engine mount bracket and that of the timing belt cover can be absorbed by deformation of the sponge gasket.

Since in such a sealing device, however, the sponge gasket is held and compressed between the rib and the portion of the timing belt cover surrounding the opening, the sponge gasket is permanently deformed during use, thereby likely causing a gap due to said permanent deformation. Consequently, a perfect sealing can not be performed.

Such a permanent deformation of sponge can be prevented by utilizing rubber in place of sponge as the material for the gasket. In this connection, however, since a plate-like rubber gasket exhibits a large reaction force when compressed, there arises another problem such that the timing belt cover undergoes larger strain and deformation. As mentioned above, the gasket made of sponge involves the problem of its permanent deformation, and the gasket made of rubber in place of sponge involves the problem of deformation of the timing belt cover.

SUMMARY OF THE INVENTION

For overcoming the aforesaid conventional problems, it is the object of the present invention to provide a sealing device for a timing belt cover and an engine mount bracket wherein the gasket is not likely to undergo a permanent deformation and further it does not exert an excessive reaction force on the timing belt cover.

It is another object of the present invention to provide a sealing device for a timing belt cover and an engine mount bracket which is provided with a gasket capable of absorbing by virtue of elasticity both a dimensional variation in manufacture of the engine mount bracket and that of the timing belt cover.

In order to achieve the above-mentioned objects, in the sealing device for a timing belt cover and an engine mount bracket of the present invention, the engine mount bracket is provided with a rib situated apart from the portion of the timing belt cover surrounding the opening and facing said portion. And a gasket made of an elastic material other than sponge, e.g. rubber, is interposed between the rib of the engine mount bracket and said portion of the timing belt cover surrounding the opening to seal therebetween. The gasket has a lip of C-shaped section and a fixed portion continuous from said lip of C-shaped section extending along said portion of the timing belt cover surrounding the opening. The fixed portion is fixed to said portion of the timing belt cover surrounding the opening, and said lip of C-shaped section is in contact with the rib of the engine mount bracket.

In the sealing device of such a construction as mentioned above, because the gasket is made of a material other than sponge, e.g. rubber, a permanent strain or a permanent deformation ascribable to material properties will not occur, and the durability of the gasket is considerably improved. Furthermore, since the gasket has an easily deformable lip of C-shaped section, a compressive load can be absorbed by an elastic deformation of the lip of C-shaped section, so that a reaction force so large as to cause deformation is not exerted on the timing belt cover. Therefore, both of the above-referred two problems, the permanent deformation of the gasket and the excessive deformation of the timing belt cover, can be overcome.

BRIEF DESCRIPTION OF THE DRAWINGS

The above and other objects, features and advantages of the present invention will become apparent and more readily appreciated from the following detailed description of present preferred exemplary embodiments of the invention taken in conjunction with the accompanying drawings, in which:

FIG. 7 is an enlarged sectional view of a gasket used in a sealing device according to the first embodiment of the invention;

FIG. 8 is a front view of the gasket of FIG. 7;

FIG. 9 is a sectional view of the gasket of FIG. 7 fitted to a portion of the timing belt cover surrounding an opening;

FIG. 10 is a sectional view of the gasket and the vicinity thereof wherein a fore end of a lip of the gasket is in contact with a fixed portion of the gasket;

FIG. 11 is a sectional view of the gasket and the vicinity thereof wherein the lip of the gasket is in close contact with the fixed portion of the gasket;

DESCRIPTION OF THE PREFERRED EMBODIMENTS

Preferred embodiments of the sealing device for the timing belt cover and the engine mount bracket of the present invention will be described hereinunder with reference to the accompanying drawings.

Figure 1:
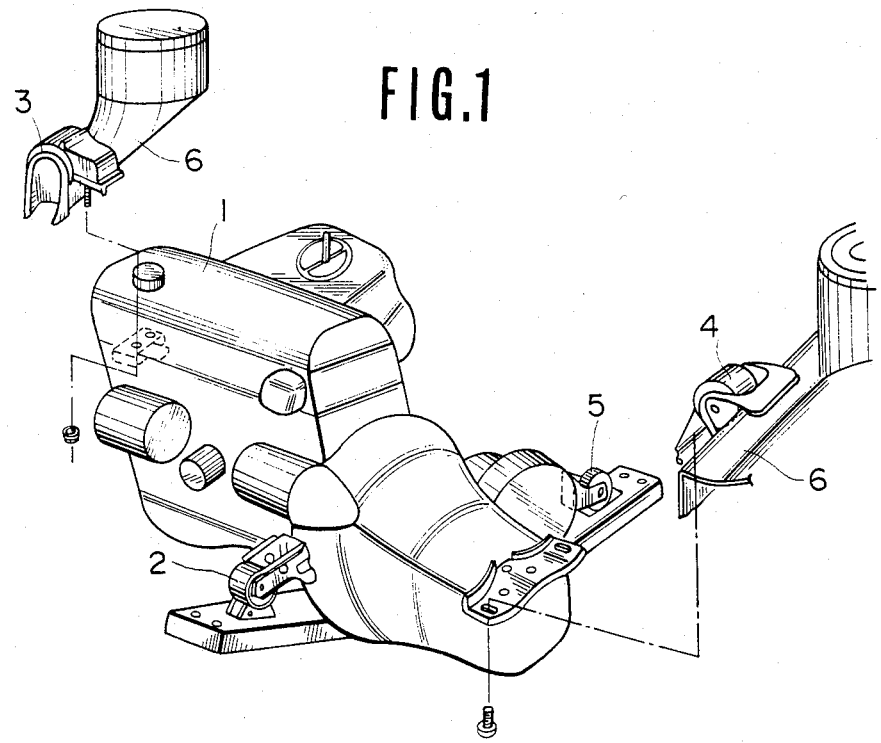
FIG. 1 is a perspective view of a supporting device for mounting an engine on a vehicle body.
Figure 2:
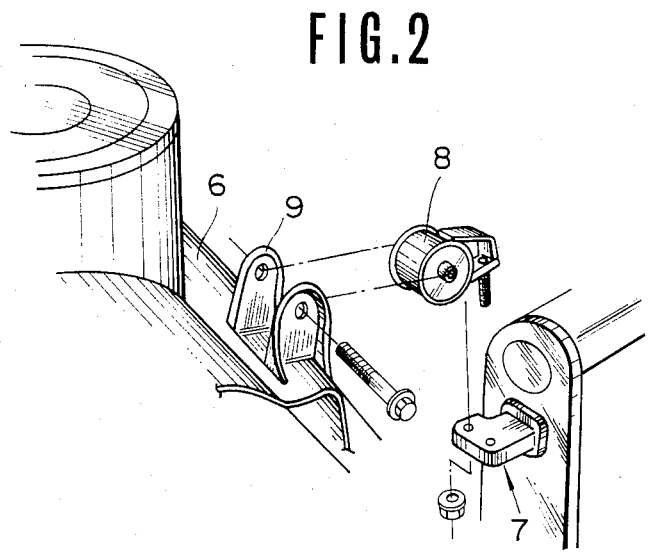
FIG. 2 is an enlarged perspective view of an engine mount bracket and the vicinity thereof shown in FIG. 1.

FIG. 1 shows transversally mounted engine in a front engine front drive vehicle, in which an engine 1 is supported by a vehicle body 6 through four engine supports comprising a front engine support 2, a right-hand engine support 3, a left-hand engine support 4 and a rear engine support 5. The right-hand engine support 3, as shown more in detail in FIG. 2, has an engine mount bracket 7 attached to the engine 1, an engine mount 8 made of an elastic material, and a bracket 9 attached to the body 6. By interconnecting the engine mount bracket 7 and the bracket 9 through the engine mount 8, the engine 1 is supported by the body 6.

Figure 3:
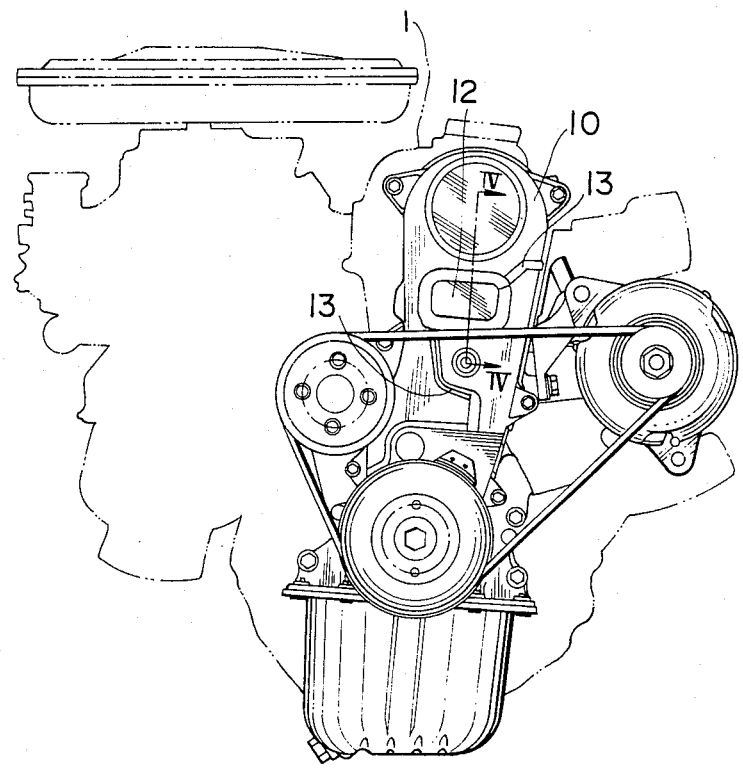
FIG. 3 is a front view of a sealing device for a timing belt cover and an engine mount bracket according to the present invention.
Figure 4:
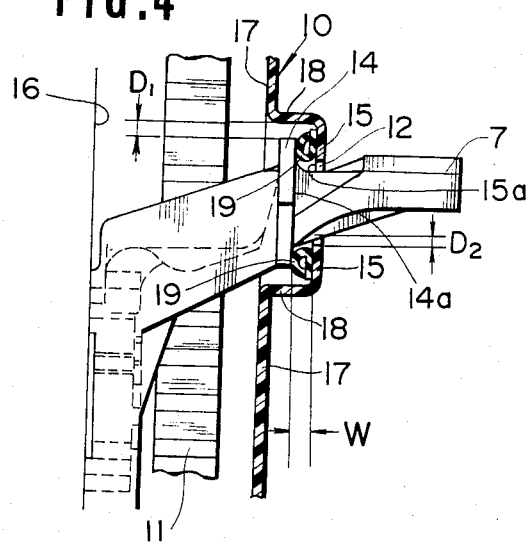
FIG. 4 is an enlarged sectional view taken on line IV—IV of FIG. 3.

On the other hand, as shown in FIGS. 3 and 4, a timing belt cover 10 is attached to the engine 1 to protect a timing belt 11 from water, dust, pebbles or the like, said timing belt being disposed within a space between the timing belt cover 10 and the engine 1. The timing belt cover 10 has a generally rectangular opening 12 through which the engine mount bracket 7 penetrates.

Figure 5:
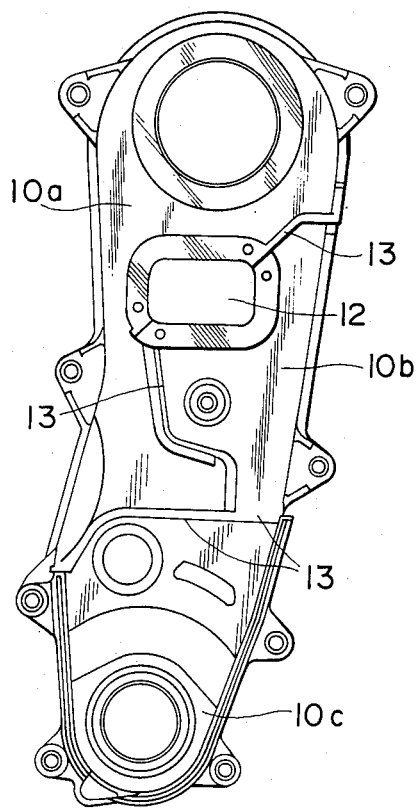
FIG. 5 is an enlarged front view of the timing belt cover in the sealing device of FIG. 3.

The timing belt cover 10 is of a three-split construction having three split portions 10a 10b and 10c as shown in FIG. 5, and it is made of a heat-resistant synthetic resin. A split line 13 formed between the split portions 10a and 10b passes through the opening 12. Therefore, the timing belt cover 10 can be assembled by attaching the split portions 10a, 10b and 10c to the engine 1 after the engine and the right-hand engine support 3 are assembled.

Figure 6:
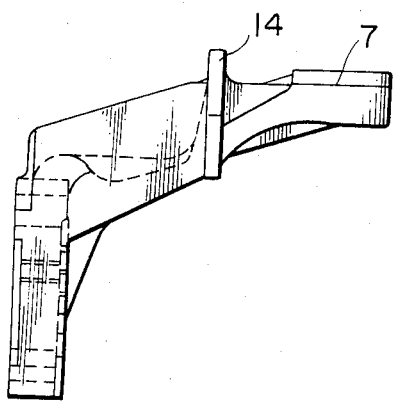
FIG. 6 is a side view of the engine mount bracket in the sealing device shown in FIG. 4.

FIG. 6 shows the engine mount bracket 7, which has a rib 14 formed integrally therewith near the opening 12 provided in the timing belt cover 10. As shown in FIG. 4, the rib 14 extends outwards from the engine mount bracket 7 and the surface of the rib 14 is opposite to the portion 15 of the timing belt cover 10 surrounding the opening 12. The rib 14 is formed surrounding the engine mount bracket, and its external form is made rectangular so that the rib 14 is opposite to said portion 15 defining the rectangular opening 12.

The timing belt cover 10, as shown in FIG. 4, has, in the vicinity of the opening 12, a cover body 17 extending, substantially in parallel with the surface of the engine 1, a bent and extending portion 18 which is bent at a right angle from the cover body 17 and extends in the direction opposite to the engine 1, and said portion 15 of the timing belt cover 10 surrounding the opening 12 which is bent from said bent and extending portion 18 and again extends substantially in parallel with the engine 1. Said portion 15 extends in parallel with the rib 14 of the engine mount bracket 7 at a space W. Further, a gap $D_1$ is formed between said bent and extending portion 18 of the timing belt cover 10 and the outer periphery of the rib 14, and also a gap $D_2$ is formed between the periphery of the opening 12 and the engine mount bracket 7. Said space W and the gaps $D_1$ and $D_2$ absorb dimensional variation in manufacture of the engine mount bracket 7 and the timing belt cover 10 and prevent interference therebetween.

Between the rib 14 of the engine mount bracket 7 and said portion 15, a gasket 19 made of rubber is interposed. Said gasket 19 extends annularly around the center line of the opening 12, provided however that the gasket 19 is divided into plural portions in the annular direction at the periphery of the opening 12 and at the positions where the split line 13 of the timing belt cover 10 passes the opening 12. In the illustrated embodiment, the gasket 19 is divided in two. The reference numeral 34 (appearing in FIG. 8) indicates a split portion of the gasket 19. The gasket 19, as shown in FIGS. 7 through 15, has a lip 20 of C-shaped section and a fixed portion 21 continuous from said lip of C-shaped section and extending along said portion 15 of the timing belt cover 10 surrounding the opening 12. The gasket 19 is fixed, at its fixed portion 21, to said portion 15 and is in contact, at its lip 20, with the rib 14 of the engine mount bracket 7, thereby effecting a sealing between the timing belt cover 10 and the engine mount bracket 7.

FIGS. 7 through 11 show an enlarged scale of the gasket 19 in sealing device according to the first embodiment of the present invention. In a free state of the gasket 19, as shown in FIG. 7, there exists a space S between the fore end of the lip 20 of C-shaped section and the fixed portion 21. Moreover, the gasket 19, in a free state thereof, has the lowest portion 22 of said lip 20 of C-shaped section which is formed rectilinear and extending perpendicular to the fixed portion 21 of the gasket 19.

Referring to FIG. 4 and FIG. 7, W denotes the space between a surface 14a of the rib 14 facing said portion 15 and a surface 15a of said portion 15 facing the rib 14, and t denotes the thickness of the gasket 19, and d denotes one half of the space between a surface 20a of the lip 20 and a surface 21a of the fixed portion 21 when the lip 20 is pushed by the rib 14 towards the fixed portion 21 and the fore end of the lip 20 commences to touch on the fixed portion 21. Among the above-mentioned W, t and d, there exists the relationship of $2t \leq W \leq 2t + 2d$. That is, in case that W is set so as to be "$2t+d$", the tolerance of W is $\pm d$ due to the deformation of the gasket 19. The surface of the cast rib 14 of the engine mount bracket 7 undergoes a maximum dimensional variation of about $\pm 1.0$ mm in the manufacture thereof, and the surface of said portion 15 undergoes a maximum dimensional variation of about ±0.5 mm in the manufacture thereof. Therefore, the gasket 19 must be capable of absorbing a dimensional variation of ±1.5 mm (total of ±1.0 mm and ±0.5 mm). For this reason, d is set at 1.5 mm.

Fixing of the fixed portion 21 of the gasket 19 to the timing belt cover 10 is effected by a double-coated tape 23 and a projection 24 projecting from the fixed portion of the gasket 19. The double-coated tape 23 is interposed between the fixed portion 21 and said portion 15 of the timing belt cover 10 surrounding the opening 12, whereby the fixed portion 21 is fixed to said portion 15.

Said portion 15 has a hole 25 with its center line extending in parallel with the center line of the opening 12. The projection 24 has the same length as that of the hole 25 and it is inserted into the hole 25. In a free state of the gasket 19, the projection 24 has an outside diameter larger than the inside diameter of the hole 25, so that when the projection 24 is forced into the hole 25, it undergoes a compressive force from the inner surface of the hole 25. Thus, the projection 24 is firmly fixed to the hole 25 and hence the gasket 19 is firmly fixed to the timing belt cover 10.

The operation of the above-constructed sealing device in the first embodiment will be described below.

Since the gasket 19 is made of rubber, it is not likely to undergo a permanent deformation when deformed between the engine mount bracket 7 and the timing belt cover 10 unlike in the case of the gasket being made of sponge.

Moreover, because the gasket 19 has an easily deformable lip 20, the timing belt cover 10 will never undergo a large reaction force and excessive deformation.

In the gasket 19 having a C-shaped section, when pressure is applied to the outer surface of the lip 20, the lip is deformed without undergoing almost any resistance until its fore end comes into contact with the fixed portion 21 because of the presence of the space S. Then, once the fore end of the lip 20 comes into contact with the fixed portion 21, the lip 20 is supported, at both fore and base ends thereof, by the fixed portion 21. Therefore, when the gasket is further deformed, the gasket 19 exhibits elasticity and produces an appropriate reaction force. The rectilinear portion 22 functions to give stiffness to the lip 20 and increases the reaction force against deformation. When the gasket 19 is interposed between the rib 14 and said portion 15, the fore end of the lip 20 is in a state of being in contact with the fixed portion 21, and the lip 20 and the rib 14 have an appropriate contact pressure. The rectilinear portion 22 increases this contact pressure, provided this contact pressure is not so large as to cause deformation of the timing belt cover 10 as previously noted. By virtue of contact due to such an appropriate contact pressure, the gasket 19 firmly seals between the engine mount bracket 7 and the timing belt cover 10 to prevent water, dust, pebbles or the like from getting into the space where the timing belt 11 is disposed.

The ability of the gasket 19 absorbing the dimensional variation is as follows: In case that t, the thickness of the gasket 19, is 1 mm and d, one half of the space between the lip 20 and the fixed portion 21 at the time of the contact of the lip 20 with the fixed portion 21 being commenced, is 1.5 mm, the gasket 19 serves to ensure the sealing ranging from the state of W=5 mm as shown in FIG. 10 in which the fore end of the lip 20 commences to touch on the fixed portion 21 up to the state of W=2 mm as shown in FIG. 11 in which the lip 20 wholly touches on the fixed portion 21. Therefore, if the space W between the rib 14 and said portion 15 is set so as to be 3.5 mm (2t+d), variation in W caused by dimensional variation in manufacture is tolerable up to ±1.5 mm. The dimension of the surface of the cast rib 14 of the engine mount bracket 17 varies, in manufacture thereof, in range of about ±1.0 mm and the dimension of the surface of said portion 15 varies in the range of about ±1.5 mm. In this connection, however, by setting d=1.5 mm as mentioned above, the gasket 19 can absorb the dimensional variation of ±1.5 mm which is the sum of dimensional variation of the rib 14 and the dimensional variation of the timing belt cover 10 and therefore, there arises no problem.

The dimensional variation is absorbed by the gasket 19 in the direction in parallel with the center line of the opening 12. Since the outer peripheral end face of the rib 14 and the bent portion 18 are set at $D_1$, a large space apart, there is no restriction in relation to absorption of the dimensional variation in the direction orthogonal to the center line of the opening 12.

Figure 12:
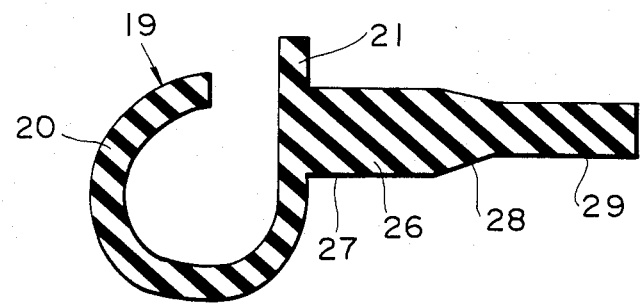
FIG. 12 is an enlarged sectional view of a gasket used in a sealing device according to the second embodiment of the invention.
Figure 13:
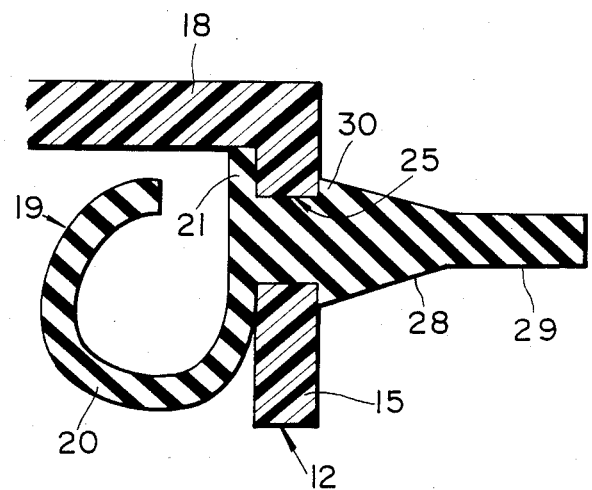
FIG. 13 is a sectional view of the gasket of FIG. 12 as attached to the timing belt cover.

Referring now to FIGS. 12 and 13, there is shown an enlarged scale of a gasket 19 in a sealing device according to the second embodiment of the present invention. The difference of the second embodiment from the first embodiment lies in the structure of a rod-like portion 26 which corresponds to the projection 24 formed on the fixed portion 21 of the gasket 19 of the first embodiment and the other portions are of the same construction as in the first embodiment, thus being indicated by the same reference numerals as in the first embodiment without any explanation thereof being made.

In the second embodiment, the rod-like portion 26 longer than the length of the hole 25 formed in said portion 15 is formed on the fixed portion 21 of the gasket 19 corresponding to the hole 25. The gasket 19 is fixed to the timing belt cover 10 in the state that the rod-like portion 26 is forced to penetrate the timing belt cover 10 through the hole 25.

The rod-like portion 26 comprises a large-diameter portion 27 longer than the length of the hole 25, a tapered portion 28 extending continuously from the large-diameter portion 27 and gradually reducing in diameter, and a small-diameter portion 29 having an outside diameter smaller than the inside diameter of the hole 25 and extending continuously from the tapered portion 28.

In a free state of the gasket 19, the large-diameter portion 27 of the rod-like portion 26 has an outside diameter larger than the inside diameter of the hole 25 formed in said portion 15. Therefore, when the large-diameter portion 27 is forced into the hole 25, it is compressed by the hole 25 and expands upon coming out of the hole 25. The reference numeral 30 in FIG. 13 indicates the expanded portion. The expanded portion 30 cooperates with the fixed portion 21 to hold therebetween said portion 15 of the timing belt cover 10.

The operation of the above-constructed sealing device in the second embodiment will be described below.

For having the rod-like portion 26 penetrate the hole 25, first, the small-diameter portion 29 is inserted into the hole 25. This insertion is easy because the outside diameter of the small-diameter portion 29 is smaller than the inside diameter of the hole 25. Then, the end of the small-diameter portion 29 having penetrated through and come out of the hole 25 is pulled by hand until the fore portion of the large-diameter portion 27 comes out of the hole 25. Upon the pulling force being relieved, the large-diameter portion 27 existing within the hole 25 is compressed by the inner surface of the hole 25 and the large-diameter portion 27 having penetrated through and come out of the hole 25 forms the expanded portion 30. Thus, by a simple operation of pulling by hand the end of the rod-like portion 26 and relieving the pulling force, the gasket 19 can be attached and firmly fixed to the timing belt cover 10 without coming off the hole 25 because of the expanded portion 30. The other operations of the gasket 19 are the same as in the first embodiment.

Figure 14:
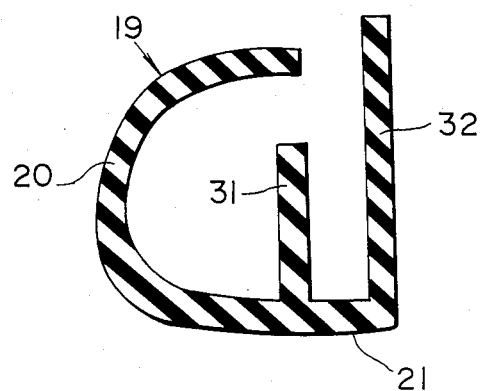
FIG. 14 is an enlarged sectional view of a gasket used in a sealing device according to the third embodiment of the invention.
Figure 15:
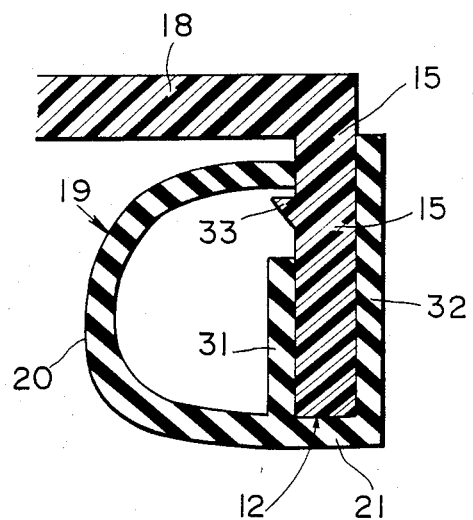
FIG. 15 is a sectional view of the gasket of FIG. 14 as attached to the timing belt cover.

Referring now to FIGS. 14 and 15, there is shown an enlarged scale of a gasket 19 in a timing belt cover sealing device according to the third embodiment of the present invention. The difference of the third embodiment from the first embodiment lies in the structure of a fixed portion 21 of the gasket and the other portions are of the same construction as in the first embodiment, thus being indicated by the same reference numerals as in the first embodiment without any explanation thereof being made.

In the third embodiment, the fixed portion 21 of the gasket 19 has two tongues 31 and 32. The former tongue extends along one surface of said portion 15 opposite to the rib 14 and the latter tongue extends along the other surface of said portion 15. The space between the tongues 31 and 32 is the same as the thickness of said portion 15, and the two tongues 31 and 32 hold therebetween said portion 15.

On the surface of said portion 15 facing the rib 14 is formed a projection 33 projecting toward the rib 14. The end of the lip 20 of the gasket 19 abuts on said portion 15 at the position opposite to the opening 12 with respect to the projection 33 when the gasket 19 is attached to the timing belt cover 10.

The tongue 31 extends up to a position near the projection 33, and the tongue 32 extends longer than the tongue 31.

The operation of the above-constructed sealing device in the third embodiment will be described below.

The fixed portion having two tongues 31 and 32 can be mounted on said portion 15 from the side of the opening 12 and therefore, mounting thereof is easy. And once mounted, the tongues 31 and 32 hold said portion 15 thereby making the fixing of the gasket 19 firm. Furthermore, the fixed portion 21 is prevented from coming off in the direction of the opening 12 because the fore end of the lip 20 comes into engagement with the projection 33. The other operations of the gasket 19 are the same as in the first embodiment.

According to the sealing device of the present invention constructed as above, the following various effects can be obtained. First, there is no likelihood of a permanent deformation of the gasket 19 made of rubber unlike in the sponge gasket. Besides, since the gasket 19 has the lip 20, an excessive deformation of the timing belt cover 10 can be prevented by deformation of the lip 20. Also by deformation of the lip 20 of the gasket 19, dimensional variation in manufacture of the engine mount bracket and the timing belt cover can be absorbed. Further, the gasket 19 can be attached easily and fixed firmly to the timing belt cover 10.

Although only preferred embodiments of the present invention have been described in detail, it will be appreciated by those skilled in the art that various modifications and alterations can be made to the particular embodiment shown without materially departing from the novel teachings and advantages of this invention. Accordingly, it is to be understood that all such modifications and alterations are included within the scope of the invention as defined by the following claims.

What is claimed is:

1. A sealing device for a timing belt cover and an engine mount bracket, said timing belt cover being provided with an opening and said engine mount bracket penetrating through said opening, said sealing device comprising:
    a rib formed on said engine mount bracket, said rib being situated apart from a portion of the timing belt cover surrounding the opening and being opposite to said portion of the timing belt cover surrounding the opening; and
    a gasket made of an elastic material interposed between said rib and said portion of the timing belt cover surrounding the opening, said gasket having a lip of C-shaped section and a fixed portion continuous from said lip of C-shaped section and extending along said portion of the timing belt cover surrounding the opening, and said fixed portion of the gasket being fixed to said portion of the timing belt cover surrounding the opening, and said lip of C-shaped section of the gasket being in contact with said rib of the engine mount bracket.

2. A sealing device for a timing belt cover and an engine mount bracket as defined in claim 1, wherein said gasket is made of rubber.

3. A sealing device for a timing belt cover and an engine mount bracket as defined in claim 1, wherein said gasket, in a free state thereof, has a sectional shape having a space between a fore end of said lip of C-shaped section and said fixed portion.

4. A sealing device for a timing belt cover and an engine mount bracket as defined in claim 1, wherein said gasket, in a free state thereof, has a lowest portion of said lip of C-shaped section formed rectilinear and perpendicular to said fixed portion.

5. A sealing device for a timing belt cover and an engine mount bracket as defined in claim 1, wherein there stands, among three dimensions of the following t, d and W, the relationship of $2t \leq W \leq 2t + 2d$:
    t representing a thickness of said gasket;
    d representing one half of a space between a surface of said lip facing said fixed portion and a surface of said fixed portion facing said lip when the fore end of said lip commences to touch on said fixed portion; and
    W representing a space between a surface of said rib which is opposite to said portion of the timing belt cover surrounding the opening and a surface of said portion of the timing belt cover surrounding the opening which is opposite to said rib.

6. A sealing device for a timing belt cover and an engine mount bracket as defined in claim 1, wherein a double-coated tape is interposed between said fixed portion of the gasket and said portion of the timing belt cover surrounding the opening.

7. A sealing device for a timing belt cover and an engine mount bracket as defined in claim 1, wherein said portion of the timing belt cover surrounding the opening has a hole with a center line extending in a direction in parallel with a center line of said opening and said fixed portion of the gasket has a projection of equal length as that of said hole and said gasket is fixed to said timing belt cover in a state that said projection is inserted into said hole.

8. A sealing device for a timing belt cover and an engine mount bracket as defined in claim 7, wherein in a free state of said gasket, said projection has an outside diameter larger than an inside diameter of said hole formed in said portion of the timing belt cover surrounding the opening, and said projection is compressed by said hole while said projection is forced into said hole.

9. A sealing device for a timing belt cover and an engine mount bracket as defined in claim 1, wherein said fixed portion of the gasket has two tongues, and one tongue extends along one surface of said portion of the timing belt cover surrounding the opening, said surface being opposite to said rib, and the other tongue extends along another surface of said portion of the timing belt cover surrounding the opening, and said two tongues hold therebetween said portion of the timing belt cover surrounding the opening when said gasket is attached to said timing belt cover.

10. A sealing device for a timing belt cover and an engine mount bracket as defined in claim 9, wherein said portion of the timing belt cover surrounding the opening has a projection projecting toward said rib of the engine mount bracket, and the fore end of said lip of the gasket comes into contact with said portion of the timing belt cover surrounding the opening at a position opposite to said opening with respect to said projection when said gasket is attached to said timing belt cover.

11. A sealing device for a timing belt cover and an engine mount bracket as defined in claim 1, wherein said timing belt cover comprises a combination of split portions, with a split line defined by said split portions passing through said opening.

12. A sealing device for a timing belt cover and an engine mount bracket as defined in claim 11, wherein said gasket is split into plural portions in an annular direction at a position of said split lines.

13. A sealing device for a timing belt cover and an engine mount bracket as defined in claim 1, wherein said portion of the timing belt cover surrounding the opening has a hole with a center line extending in a direction in parallel with a center line of said opening, and said fixed portion of the gasket has a rod-like portion longer than the length of said hole, and said gasket is fixed to said timing belt cover in a state that said rod-like portion penetrates said hole.

14. A sealing device for a timing belt cover and an engine mount bracket as defined in claim 13, wherein said rod-like portion has a large-diameter portion longer than the length of said hole, a tapered portion extending continuously from said large-diameter portion and gradually reduced in diameter, and a small-diameter portion extending continuously from said tapered portion and having an outside diameter smaller than an inside diameter of said hole.

15. A sealing device for a timing belt cover and an engine mount bracket as defined in claim 14, wherein in a free state of said gasket, said large-diameter portion of the rod-like portion has an outside diameter larger than the inside diameter of said hole formed in said portion of the timing belt cover surrounding the opening, and the portion of said large-diameter portion existing within said hole is compressed by an inner surface of said hole and the portion of said large-diameter portion having penetrated through and come out of said hole expands.

16. A sealing device for a timing belt cover and an engine mount bracket as defined in claim 15, wherein the expanded portion of said rod-like portion formed upon coming out of said hole cooperates with said fixed portion of the gasket to hold therebetween said portion of the timing belt cover surrounding the opening.

* * * * *